Sept. 17, 1946.   C. DREYFUS   2,407,632
SCREENING MATERIAL
Filed Nov. 11, 1944
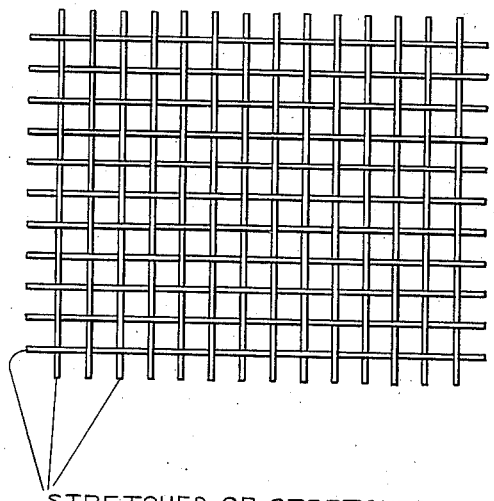
STRETCHED, OR STRETCHED
AND SAPONIFIED CELLULOSE
ESTER THREADS COATED WITH
A WATER-RESISTANT DERIVATIVE
OF CELLULOSE.
INVENTOR.
CAMILLE DREYFUS.
BY
ATTORNEYS Patented Sept. 17, 1946

2,407,632

UNITED STATES PATENT OFFICE 2,407,632

SCREENING MATERIAL

Camille Dreyfus, New York, N. Y.

Application November 11, 1944, Serial No. 563,092

17 Claims. (Cl. 28—80)

This invention relates to window screens and relates more particularly to window screens woven of threads of artificial filamentary materials possessing high tenacity and improved dimensional stability.

Window screens are widely employed for screening homes, automobiles, trailers, barns and the like, with the object of preventing the entrance of insects yet permitting the free circulation of air. Usually, such window screens are formed of woven wire cloth. Wire cloth, however, is subject to rusting or weathering and may be easily bent or deformed to a substantially permanent degree by pressure or when accidentally pierced by a pointed object. Certain woven fabrics, such as cotton mesh, are also employed as screening materials but such materials are also subject to weathering. They tend to absorb a relatively high proportion of moisture which causes unsightly swelling and sagging, and, after any extended exposure, the cotton materials usually deteriorate, becoming so tender that they fall apart under the slightest strain. Materials from which window screens may be formed, yet which are not subject to the service limitations of materials heretofore employed, have long been sought.

It is, therefore, an important object of my invention to provide window screens formed of materials possessing high dimensional stability and weather-resistance.

Another object of my invention is the use in screens of improved threads prepared by a novel coating operation.

A further object of my invention is the provision of window-screening materials which provide ample air circulation, are inexpensive and which may be produced in attractive colorful shades.

Yet another object of my invention is to provide window screens of high flexibility, comprising woven fabric material which may be rolled and unrolled or folded and unfolded without damage.

Other objects of my invention will appear from the following detailed description.

The figure of the accompanying drawing shows in diagrammatic form a screen of the present invention.

In accordance with my invention, I make window screens of open mesh fabric materials formed by weaving or netting yarns or threads, having a basis of an organic acid ester of cellulose, which have been stretched, or which have been stretched and fully saponified and coated with at least 100% by weight of a moisture-resistant organic derivative of cellulose. I have found that by coating said yarns to such degree, moisture absorption is permanently maintained below that amount which normally causes sagging, stretching and deterioration of the screening materials. Furthermore, not only are these novel coated yarns strongly resistant to weathering but they are highly flexible and resist any type of deformation to a very substantial degree even under considerable stress. Even when forced apart, as by a sharp instrument, the woven, coated threads forming the screening material may readily be re-aligned in their original position.

Organic derivatives of cellulose which are especially valuable for coating said yarns in accordance with my invention are, for example, cellulose ethers, such as ethyl cellulose, of 41 to 55% ethoxyl, or moisture-resistant organic acid esters of cellulose such as cellulose propionate of relatively high propionyl value, i. e. 54 to 67%, calculated as propionic acid, or mixed organic acid esters of cellulose such as cellulose acetate-propionate or cellulose acetate-butyrate.

The coated yarns or threads employed in forming my novel screen materials may comprise mono-filament or single filament yarns as well as multi-filament yarns or threads. Such yarns or threads may have a denier of from 250 to 500 or 1000 prior to the application of the coating and, following the coating operation, the yarns or threads will have a denier of from at least 500 to 2000. Where multi-filament threads are employed, the latter may be formed by grouping together a plurality of individual yarns, each containing 10, 20, 30 or 40 or more filaments, and, by suitable doubling and twisting operations, associated to form a thread of the desired denier.

In applying the coating to the threads, I have found that the coating is most advantageously applied in solution in a volatile solvent therefor and in a series of operations, a relatively thin layer being applied each time with the yarns being dried at elevated temperature following each application. By placing the coating on the threads in a plurality of layers a much more uniform and adherent coating is built up with the result that the coated yarns exhibit improved moisture resistance and weathering qualities as compared to yarns which are coated in the desired thickness in but a single operation. Preferably, the desired thickness is applied in at least five applications.

Suitable solvents which may be employed for the application of the coating are, for example, benzol, mixtures of benzol and acetone, or other volatile organic solvents or solvent mixtures which do not exert too great a solvent action on the cellulose ester yarn being coated. When yarns to be coated have a basis of a stretched and saponified organic ester of cellulose, the choice of a suitable solvent is limited only by the degree of volatility desired in the particular solvent employed and the solubility of the coating material therein. The coating solutions may contain cellulose derivative base material in an amount ranging from 5 to 15% by weight on the solution.

The yarns or threads may be prepared by extruding a solution of cellulose acetate or other organic ester of cellulose in a suitable volatile solvent through an orifice into an evaporative medium as in the dry method of spinning, or into a coagulating medium as in the wet method of spinning. A plurality of filaments may be extruded through several orifices and associated to form a thread, or a single filament of relatively large denier may be extruded through a large orifice into the evaporative or coagulative atmosphere and a relatively high denier mono-filament obtained. The formed filaments may be stretched simultaneously with their formation or subsequent to their formation after being softened by means of a suitable softening medium such as, for example, solvent vapors, steam, hot water or even dry heat. The softened yarns may be stretched 300, 500, 1000 or even 2000% or more of their original length during the stretching operation. Stretching greatly increases the tenacity of the yarns and this increase in tenacity is retained and frequently increased substantially when the stretched organic ester of cellulose yarns are saponified so that a regenerated cellulose yarn is obtained.

The saponification of the organic ester of cellulose yarns may be carried out employing any suitable basic agent. Inorganic saponifying agents such as aqueous solutions of sodium hydroxide, potassium hydroxide, sodium silicate, sodium carbonate or ammonium hydroxide are satisfactory. Organic saponifying agents, for example, ethyl amine, methyl amine or other organic base may also be employed. Saponification may be effected at temperatures of 20 to 100° C. When employing aqueous solutions of sodium hydroxide, for example, as the saponifying agent, said solutions may be of a concentration of 0.1 to 5% by weight and saponification may be effected at temperatures of 30 to 90° C. in 30 to 180 minutes. Usually, when employing aqueous saponifying solutions comprising sodium hydroxide, a salt such as sodium chloride or sodium acetate is advantageously added to the saponifying baths.

Colored coated filaments of any desired shades may be produced either by incorporating coloring matter into the solution from which the original yarns are spun, by dyeing the spun yarns prior to or subsequent to stretching and/or saponification, or by incorporating suitable coloring matter in the solutions employed for coating the threads. The incorporation of dyes or pigments in the spinning solutions from which the yarns or threads are formed by extrusion operations enables a permanently colored yarn or thread to be formed. The colors are fully retained even after substantial weathering and the application of the coating material in an amount of at least 100% on the weight of the original yarns, in accordance with my novel process, aids substantially in increasing the permanency of the colored yarns or threads.

Furthermore, I have found that substantial advantages may be gained in the form of even greater weather resistance by incorporating an ultra-violet filtering material such as, for example, a colorless acid salt of a quinine base, in the coating solution. Examples of suitable acid salts of quinine bases which may be employed are quinine bisulfate, quanidine bisulfate, cinchonine bisulfate, and quinine or cinchonine dihydrochloride. The salts may be incorporated in the coating solution in amounts of from 0.1 to 5% on the weight of the coating material contained therein. All of the layers of coating material which are applied may contain the ultra-violet filtering material, or the ultra-violet filtering may be incorporated in only the surface layer or the penultimate and surface layers of the coated yarns or threads. The ultra-violet filtering material tends to prevent crazing or discoloration of the organic derivative of cellulose coating material on continued exposure to sunlight or other light rich in actinic rays, i. e. the ultra-violet portion of the spectrum.

In order further to illustrate my invention but without being limited thereto, the following examples are given:

*Example I*

A stretched cellulose acetate yarn of 480 denier is subjected to a coating operation employing ethyl cellulose as the coating material. The core yarn is formed by plying four ends of 120 denier, 120 filament, 5 turns per inch cellulose acetate yarn which has been stretched 1000% of its original length by a suitable stretching operation. The ethyl cellulose, of 48% ethoxyl, is coated on the yarns in the form of a 7% solution employing benzol as the solvent. The coating is applied by drawing the yarn vertically upward through a tube containing the ethyl cellulose-benzol solution and then passing the coated yarn through a vertical drying tube heated to a temperature of 135° F. The effective drying length of the drying tube is about six feet. Seven applications of the coating solution are effected to achieve a 100% application of ethyl cellulose on the weight of the core yarn. The coated yarn possesses very high dimensional stability and does not sag or stretch when exposed to 100% relative humidity for a 48 hour period.

*Example II*

A 480 denier stretched cellulose acetate yarn, formed as in Example I, is coated with cellulose propionate by a coating operation which comprises leading the yarn upward through a vertical tube containing a solution containing 14% by weight of cellulose propionate dissolved in a solvent comprising 75 parts by weight of benzol and 25 parts by weight of acetone. The cellulose propionate employed has a propionyl value of 60%, calculated as propionic acid. The coated yarn is dried after each coating operation by passage through a heated tube maintained at a temperature of 100° F., in the manner described in Example I. Seven applications of the cellulose propionate solution are made to the yarn, placing a total of 123% by weight of cellulose propionate thereon in the form of a smooth, uniform coating. This cellulose propionate coated yarn possesses high dimensional stability under conditions of high humidity and does not sag or stretch after 48 hours exposure to 100% relative humidity.

When 0.5% by weight of quinine bisulfate, based on the weight of the cellulose propionate present, is incorporated in the coating solution, a substantially increased resistance to surface crazing and discoloration of the cellulose propionate coating is observed on prolonged exposure of the coated yarns to the action of sunlight or other light rich in ultra-violet light.

*Example III*

A stretched regenerated cellulose yarn of 450 denier is subjected to a coating operation employing ethyl cellulose of 48% ethoxyl value as the coating material. The core yarn is formed by plying five ends of regenerated cellulose of 90 denier/120 filament, 5 turns per inch which is prepared by stretching a cellulose acetate yarn 1000% of its original length by a suitable stretching operation, followed by saponification. The ethyl cellulose is applied to the stretched regenerated cellulose yarn in the form of a 7% solution in benzol and the solution is applied as described in Example I. To place the desired coating on the yarn, 8 applications of the ethyl cellulose solution are made to the yarn, placing a total of 110% by weight of ethyl cellulose thereon in the form of a smooth coating. The yarn is dried following each application of the solution. The coated yarn which is obtained is highly resistant to any deformation under conditions of high humidity, such as exposure for 48 hours or longer to 100% relative humidity.

It is to be understood that the foregoing detailed description is given merely by way of illustration and that many variations may be made therein without departing from the spirit of my invention.

Having described my invention, what I desire to secure by Letters Patent is:

1. A window screen comprising an open mesh fabric woven of threads of heavy denier, said threads being selected from the group consisting of stretched organic acid ester of cellulose yarns and stretched and saponified organic acid ester of cellulose yarns and carrying a coating comprising a water-resistant derivative of cellulose in an amount of at least 100% on the weight of the stretched organic acid ester of cellulose yarns.

2. A window screen comprising an open mesh fabric woven of threads of heavy denier, said threads having a basis of stretched organic acid ester of cellulose yarns and carrying a coating comprising a water-resistant derivative of cellulose in an amount of at least 100% on the weight of the stretched organic acid ester of cellulose yarns.

3. A window screen comprising an open mesh fabric woven of threads of heavy denier, said threads having a basis of stretched and saponified organic acid ester of cellulose yarns and carrying a coating comprising a water-resistant derivative of cellulose in an amount of at least 100% on the weight of the stretched and saponified organic acid ester of cellulose yarns.

4. A window screen comprising an open mesh fabric woven of threads of heavy denier, said threads having a basis of stretched cellulose acetate yarns and carrying a coating comprising a water-resistant derivative of cellulose in an amount of at least 100% on the weight of the stretched cellulose acetate yarns.

5. A window screen comprising an open mesh fabric woven of threads of heavy denier, said threads having a basis of stretched and saponified cellulose acetate yarns and carrying a coating comprising a water-resistant derivative of cellulose in an amount of at least 100% on the weight of the stretched and saponified cellulose acetate yarns.

6. A window screen comprising an open mesh fabric woven of threads of heavy denier, said threads having a basis of stretched organic acid ester of cellulose yarns and carrying a coating comprising a water-resistant derivative of cellulose in an amount of at least 100% on the weight of the stretched organic acid ester of cellulose yarns containing a colorless acid salt of a quinine base.

7. A window screen comprising an open mesh fabric woven of threads of heavy denier, said threads having a basis of stretched and saponified organic acid ester of cellulose yarns and carrying a coating comprising a water-resistant derivative of cellulose in an amount of at least 100% on the weight of the stretched and saponified organic acid ester of cellulose yarns containing a colorless acid salt of a quinine base.

8. A window screen comprising an open mesh fabric woven of threads of heavy denier, said threads having a basis of stretched cellulose acetate yarns and carrying a coating comprising a water-resistant derivative of cellulose in an amount of at least 100% on the weight of the stretched cellulose acetate yarns containing a colorless acid salt of a quinine base.

9. A window screen comprising an open mesh fabric woven of threads of heavy denier, said threads having a basis of stretched and saponified cellulose acetate yarns and carrying a coating comprising a water-resistant derivative of cellulose in an amount of at least 100% on the weight of the stretched saponified cellulose acetate yarns containing a colorless acid salt of a quinine base.

10. A window screen comprising an open mesh fabric woven of threads of heavy denier, said threads having a basis of stretched cellulose acetate yarns and carrying a coating comprising ethyl cellulose in an amount of at least 100% on the weight of the stretched cellulose acetate yarns.

11. A window screen comprising an open mesh fabric woven of threads of heavy denier, said threads having a basis of stretched and saponified cellulose acetate yarns and carrying a coating comprising ethyl cellulose in an amount of at least 100% on the weight of the stretched and saponified cellulose acetate yarns.

12. A window screen comprising an open mesh fabric woven of threads of heavy denier, said threads having a basis of stretched cellulose acetate yarns and carrying a coating comprising cellulose propionate in an amount of at least 100% on the weight of the stretched cellulose acetate yarns.

13. A window screen comprising an open mesh fabric woven of threads of heavy denier, said threads having a basis of stretched and saponified cellulose acetate yarns and carrying a coating comprising cellulose propionate in an amount of at least 100% on the weight of the stretched and saponified cellulose acetate yarns.

14. A window screen comprising an open mesh fabric woven of threads of heavy denier, said threads having a basis of stretched cellulose acetate yarns and carrying a coating comprising ethyl cellulose in an amount of at least 100% on the weight of the stretched cellulose acetate yarns containing from 0.1 to 5% by weight, on the coating, of quinine bisulfate.

15. A window screen comprising an open mesh fabric woven of threads of heavy denier, said threads having a basis of stretched and saponified cellulose acetate yarns and carrying a coating comprising ethyl cellulose in an amount of at least 100% on the weight of the stretched and saponified cellulose acetate yarns containing from 0.1 to 5% by weight, on the coating, of quinine bisulfate.

16. A window screen comprising an open mesh fabric woven of threads of heavy denier, said threads having a basis of stretched cellulose acetate yarns and carrying a coating comprising cellulose propionate in an amount of at least 100% on the weight of the stretched cellulose acetate yarns containing from 0.1 to 5% by weight, on the coating, of quinine bisulfate.

17. A window screen comprising an open mesh fabric woven of threads of heavy denier, said threads having a basis of stretched and saponified cellulose acetate yarns and carrying a coating comprising cellulose propionate in an amount of at least 100% on the weight of the stretched and saponified cellulose acetate yarns containing from 0.1 to 5% by weight, on the coating, of quinine bisulfate.

CAMILLE DREYFUS.